US005781215A

United States Patent [19]

Onishi et al.

[11] Patent Number: 5,781,215

[45] Date of Patent: Jul. 14, 1998

[54] INK JET RECORDING METHOD

[75] Inventors: Hiroyuki Onishi; Akio Owatari; Junichi Iida, all of Nagano, Japan

[73] Assignee: Seiko Epson Corporation, Tokyo, Japan

[21] Appl. No.: 628,351

[22] Filed: Apr. 5, 1996

[30] Foreign Application Priority Data

| | | | |
|---|---|---|---|
| Apr. 7, 1995 | [JP] | Japan | 7-108326 |
| Apr. 2, 1996 | [JP] | Japan | 8-104556 |

[51] Int. Cl.[6] .................. B41J 2/01; G01D 9/42

[52] U.S. Cl. .................. 347/101; 347/104; 347/105; 346/135.1

[58] Field of Search .................. 347/101, 104, 347/105; 346/135.1, 1.1; 400/579; 427/256

[56] References Cited

U.S. PATENT DOCUMENTS 4,664,952 5/1987 Arai et al. .................. 427/256

5,524,994 6/1996 Hirano et al. .................. 400/579

OTHER PUBLICATIONS

Japanese Industrial Standard, Method of Measurement for Specular Glossiness, JIS Z 8741-1983.

*Primary Examiner*—Peter S. Wong

*Assistant Examiner*—Rajnikant B. Patel

*Attorney, Agent, or Firm*—Sughrue, Mion, Zinn, Macpeak & Seas, PLLC

[57] ABSTRACT

An ink jet recording method includes the steps of: (a) holding a sheet-like recording medium having a glossy surface in which the 60-degree mirror glossiness defined in JIS Z8741 is 60% or more between a driving roller disposed on a back surface side of the sheet-like recording medium and a notched roller having a thickness in a range of 0.05 to 0.5 mm, and pressing the glossy surface with a pressing force in a range of 5 to 30 g against the driving roller; (b) carrying the sheet-like recording medium; and (c) ejecting ink onto the glossy surface so that an image is recorded by dots of the ink on the glossy surface.

8 Claims, 6 Drawing Sheets

*FIG. 5*

| KINDS OF HEAD | INK AMOUNT PER A DOT (μg/dot) | DOT RADIUS (μm) | RESOLUTION (dpi) | INK ABSORPTION (g/cm²) UPPER: MONOCHROMATIC LOWER: CHROMATIC |
|---|---|---|---|---|
| 1 | 0.1 | 110 | 360 | $8.3 \times 10^{-4}$ |
| | | | | $2.5 \times 10^{-3}$ |
| 2 | 0.06 | 100 | 360 | $6.0 \times 10^{-4}$ |
| | | | | $1.8 \times 10^{-3}$ |
| 3 | | 60 | 720 | $1.7 \times 10^{-3}$ |
| | | | | $5.1 \times 10^{-3}$ |
| 4 | 0.045 | 90 | 360 | $5.5 \times 10^{-4}$ |
| | | | | $1.7 \times 10^{-3}$ |
| 5 | | 50 | 720 | $1.8 \times 10^{-3}$ |
| | | | | $5.4 \times 10^{-3}$ |
| 6 | 0.029 | 80 | 360 | $4.5 \times 10^{-4}$ |
| | | | | $1.4 \times 10^{-3}$ |
| 7 | | 40 | 720 | $1.8 \times 10^{-3}$ |
| | | | | $5.4 \times 10^{-3}$ |
| 8 | 0.01 | 50 | 720 | $4 \times 10^{-4}$ |
| | | | | $1.2 \times 10^{-3}$ |
| 9 | | 30 | 1440 | $1.1 \times 10^{-3}$ |
| | | | | $3.3 \times 10^{-3}$ |
| 10 | 0.002 | 20 | 1440 | $5 \times 10^{-4}$ |
| | | | | $1.5 \times 10^{-3}$ |
| 11 | | 10 | 1440 | $2 \times 10^{-3}$ |
| | | | | $6.0 \times 10^{-3}$ |

FIG. 6

| | GLOSSINESS | PRESSING FORCE (g) | CARRYING ACCURACY | NOTCH MARK |
|---|---|---|---|---|
| EXAMPLE 1 | 60 | 30<br>15<br>5 | ◎<br>◎<br>○ | ◎<br>◎<br>◎ |
| EXAMPLE 2 | 70 | 30<br>15<br>5 | ◎<br>◎<br>○ | ○<br>◎<br>◎ |
| EXAMPLE 3 | 80 | 30<br>15<br>5 | ◎<br>◎<br>○ | ○<br>◎<br>◎ |
| EXAMPLE 4 | 90 | 30<br>15<br>5 | ◎<br>◎<br>○ | ○<br>◎<br>◎ |
| COMPARATIVE EXAMPLE 1 | 60 | 35<br>3 | ◎<br>× | ×<br>◎ |
| COMPARATIVE EXAMPLE 2 | 70 | 35<br>3 | ◎<br>× | ×<br>◎ |
| COMPARATIVE EXAMPLE 3 | 80 | 35<br>3 | ◎<br>× | ××<br>◎ |
| COMPARATIVE EXAMPLE 4 | 90 | 35<br>3 | ◎<br>× | ××<br>◎ |

INK JET RECORDING METHOD

BACKGROUND OF THE INVENTION

The present invention relates to an ink jet recording method, and more particularly relates to an ink jet recording method which uses a sheet-like recording medium having a glossy surface.

An ink jet recording method is a recording method in which ink drops are jetted on a recording medium so that recording is carried out by forming an image (including characters) by dots of the ink.

An ink jet recording apparatus which uses the above recording method of the type generally known is shown in FIG. 7.

In FIG. 7, the apparatus is provided with a feed tray 1, a feed roller 2, a carry roller 3, a pinch roller 4, an ink jet head 5, a discharge roller 6 and a notched roller 7 (a thin-plate star wheel).

A plurality of sheet-like recording media S in a stack are set in the feed tray 1. The feed tray 1 presses the recording media S by a predetermined force F1 against the feed roller 2 at the time of feeding the recording medium S.

The feed roller 2 comprises a rubber roller which is, hereinafter, defined as a roller having a rubber layer at least on its surface. At the time of feeding the recording medium, the feed roller 2 rotates to feed a recording medium S1 which is the uppermost one of recording media S.

The carry roller 3 comprises a rubber roller against which the pinch roller 4 is pressed by a predetermined force F2. The carry roller 3 serves as a driving roller. Accordingly, the fed recording medium S is carried while being pressed and held between the carry roller 3 and the pinch roller 4.

The ink jet head 5 jets ink drops onto the recording medium S to thereby form an image by dots of the ink.

The discharge roller 6 is constituted by a rubber roller against which the notched roller 7 is pressed by a predetermined force F3. The discharge roller 6 is constituted to act as a driving roller while, generally, the notched roller 7 is constituted to act as a driven roller. Accordingly, the recorded recording medium is touched at its recording surface by the notched roller 7, and carried so as to be discharged while being pressed and held between the discharge roller 6 and the notched roller 7.

The peripheral speed of the discharge roller 6 is set to be somewhat higher than the peripheral speed of the carry roller 3 so that the recording medium S is carried in a state where the recording medium S on which recording is being made is stretched between the carry roller 3 and the discharge roller 6. Accordingly, the carrying force by means of the discharge roller 6 gives an influence on the accuracy of carrying the recording medium S on which recording is being made.

In the recording medium S for use in such an ink jet recording method, generally known is a recording medium having a glossy printing surface, or a coated paper having an ink acceptable layer on the front surface side as well as ordinary paper.

By utilizing such recording medium having the glossy printing surface or coated paper, it is possible to obtain a recording condition in which the coloring density is higher and the hue is clearer than those in ordinary paper. That is, it is possible to obtain better color reproducibility. Further, a so-called feathering phenomenon in which bleeding occurs along pulp fibers can be prevented so that the roundness of each dot is improved. Further, in case of the coated paper, the diameter of each dot can be controlled by selection of the components in the ink acceptable layer so that it is possible to make the resolution high.

Accordingly, such recording medium having the glossy printing surface or coated paper is suitable for obtaining a color image which is high in resolution. Particularly, coated paper having a glossy surface in which the 60-degree mirror glossiness defined in JIS (Japanese Industrial Standard) Z8741 is 60% or more (that is, glossy paper) is suitable for obtaining a clear color image which is higher in resolution.

In such an ink jet recording method as described above, since a notched roller is pressed against a recording surface of a recording medium on which an image has been formed, a dotted line remains on the recording surface as a trace where the recording surface has been pressed by the notched roller (hereinafter, the trace being referred to as "notch mark").

In the case where paper, such as ordinary paper, having a relatively rough surface is used as a recording medium, the above notch mark is not so conspicuous. However, in the case where such recording medium having has the glossy printing surface, notched marks may remain on the glossy surface and, therefore, the image quality of high resolution is deteriorated. Particularly, in case where the recording medium having a glossy surface in which the 60-degree mirror glossiness defined in JIS Z8741 is 60% or coated paper is used as a recording medium, the above notch mark remains in a conspicuous state on its glossy surface so that the image quality of high resolution is deteriorated.

SUMMARY OF THE INVENTION

It is therefore an object of the present invention to solve the above problems by providing an ink jet recording method in which the notch mark caused by the notched roller is made inconspicuous to thereby improve the glossy image quality.

In order to achieve the above object, according to an aspect of the present invention, the ink jet recording method is carried out in a manner so that a sheet-like recording medium having a glossy surface is carried while being pressed and held between a driving roller disposed on a back surface side of the sheet-like recording medium and a notched roller having a thickness in a range of 0.05 to 0.5 mm and pressing the glossy surface with pressing force in a range of 5 to 30 g against the driving roller; and ink is jetted onto the glossy surface so that an image is recorded by dots of the ink on the glossy surface.

The carrying of the recording medium includes intermittent feeding such as pitch feeding of the recording medium.

In the above ink jet recording method according a second aspect of the invention, the 60-degree mirror glossiness defined in JIS Z8741 of the front surface of the recording medium is 60% or more.

In the above ink jet recording method according to a third aspect of the invention, the sheet-like recording medium includes a coated sheet having an ink acceptable layer provided on the front surface thereon.

In the above ink jet recording method according to a fourth aspect of the present invention, preferably, the image recorded by the ink dots has a resolution not lower than 360 dpi.

In the above ink jet recording method according to a fifth aspect of the present invention, preferably, the image is recorded in a condition that the quantity of ink absorption per unit area of the sheet-like recording medium is in a range of from $4\times10^{-4}$ g/cm$^2$ to $6\times10^{-3}$ g/cm$^2$ when the ink is jetted so that the unit area is entirely covered with dots of the ink.

In the ink jet recording method according to one aspect of the present invention, ink is jetted on a glossy surface of a sheet-like recording medium having a glossy surface so that a glossy image is recorded by dots of the ink. Accordingly, it is possible to obtain a clear image (including a color image) with high resolution.

The recording medium on which an image has been recorded is carried while being pressed and held between a driving roller disposed on a back surface side of the sheet-like recording medium and a notched roller disposed on the recording surface side. Since the thickness of the notched roller is set to be in a range of from 0.05 to 0.5 mm and the pressing force of the notched roller is set in a range of from 5 to 30 g against the driving roller, not only the recording medium is carried surely to thereby obtain a glossy image with high resolution but also the image quality is not deteriorated by a notch mark.

If the thickness of the notched roller is made to be not larger than 0.05 mm, the area of the recording medium to be pressed against the driving roller becomes so small that a sufficient carrying force cannot be obtained. Accordingly, the accuracy of carrying becomes low and the positional accuracy of the dots to be formed becomes low so that it becomes impossible to obtain an image with high resolution. Further, the notched roller becomes weak in strength and poor in durability.

If the thickness of the notched roller is made to be 0.5 mm or larger, on the contrary, the notch mark becomes so large as to be conspicuous. Further, not-yet dried ink may adhere on the notched roller so that if such not-yet dried ink is transferred to a non-recording portion (for example a white portion where no dot is formed) of the recording medium, the notch mark becomes conspicuous.

If the pressing force of the notched roller is made to be 5 g or smaller, a sufficient carrying force cannot be obtained so that the accuracy of carrying becomes low and the positional accuracy of the dots to be formed becomes low. Accordingly, it becomes impossible to obtain an image with high resolution.

If the pressing force of the notched roller is made to be 30 g or larger, on the contrary, the sharp portions of the notched roller dig into the glossy surface of the recording medium so that the notch mark becomes conspicuous.

In the ink jet recording method according to the first aspect of the present invention, on the other hand, since the thickness of the notched roller is set to be in a range of 0.05 to 0.5 mm and the pressing force of the notched roller is set to be in a range of 5 to 30 g, a highly accurate carrying condition of the recording medium can be obtained so that a glossy image can be obtained with high resolution and the image quality is not deteriorated by a notch mark.

Accordingly, such an ink jet recording method is particularly effective when the recording medium where the 60-degree mirror glossiness defined in JIS Z8741 of the front surface thereon is 60% or more is used according to the second aspect, when the sheet-like recording medium which includes a coated sheet having an ink acceptable layer provided on the front surface thereon is used according to the third aspect, or when the resolution of the image formed by ink dots is not lower than 360 dpi (dots per inch) as in the fourth aspect of the present invention.

When the resolution of image is not lower than 360 dpi, the quantity of ink absorption of the recording medium becomes large to cause a tendency that the sharp portions of the notched roller becomes apt to eat into the recording medium. In the above-mentioned ink jet recording method according to the present invention, however, the sharp portions of the notched roller hardly dig into the recording medium so that the glossy image quality may not be deteriorated by a notch mark.

In the above ink jet recording method according to the fifth aspect of the present invention, since an image is recorded in a condition that the quantity of ink absorption per unit area of the sheet-like recording medium is in a range of $4\times10^{-4}$ g/cm$^2$ to $6\times10^{-3}$ g/cm$^2$ when the ink is jetted so that the unit area is entirely covered with dots of the ink (so-called solid printing), it is possible to obtain a more glossy image with higher resolution.

If the quantity of ink absorption per unit area of the sheet-like recording medium is not larger than $4\times10^{-4}$ g/cm$^2$, the dot density becomes low and it becomes impossible to obtain a clear image.

If the quantity of ink absorption per unit area of the sheet-like recording medium is not smaller than $6\times10^{-3}$ g/cm$^2$, on the contrary, the ink becomes in a state of overflow so that the ink becomes difficult to get dry and becomes difficult to be absorbed into the recording medium, and if the notched roller passes through this portion of not-yet dried ink on the recording medium, this ink may adhere to the notched roller so as to be transferred to a non-recording portion. Not only that, the overflow ink softens the recording medium. Therefore, the leading ends of the notched roller easily dig into the recording medium and notched marks remain on the recording medium.

In the ink jet recording method according to the fifth aspect of the present invention, on the other hand, since an image is recorded in a manner so that the quantity of ink absorption per unit area of the sheet-like recording medium is in a range of $4\times10^{-4}$ g/cm$^2$ to $6\times10^{-3}$ g/cm$^2$, it is possible to obtain a more glossy image with higher resolution.

BRIEF DESCRIPTION OF THE DRAWINGS

FIG. 5 is a table showing the kind of heads and the quantities of ink absorption;

FIG. 6 is a table showing various examples; and

DETAILED DESCRIPTION OF THE PREFERRED EMBODIMENTS

Figure 1:
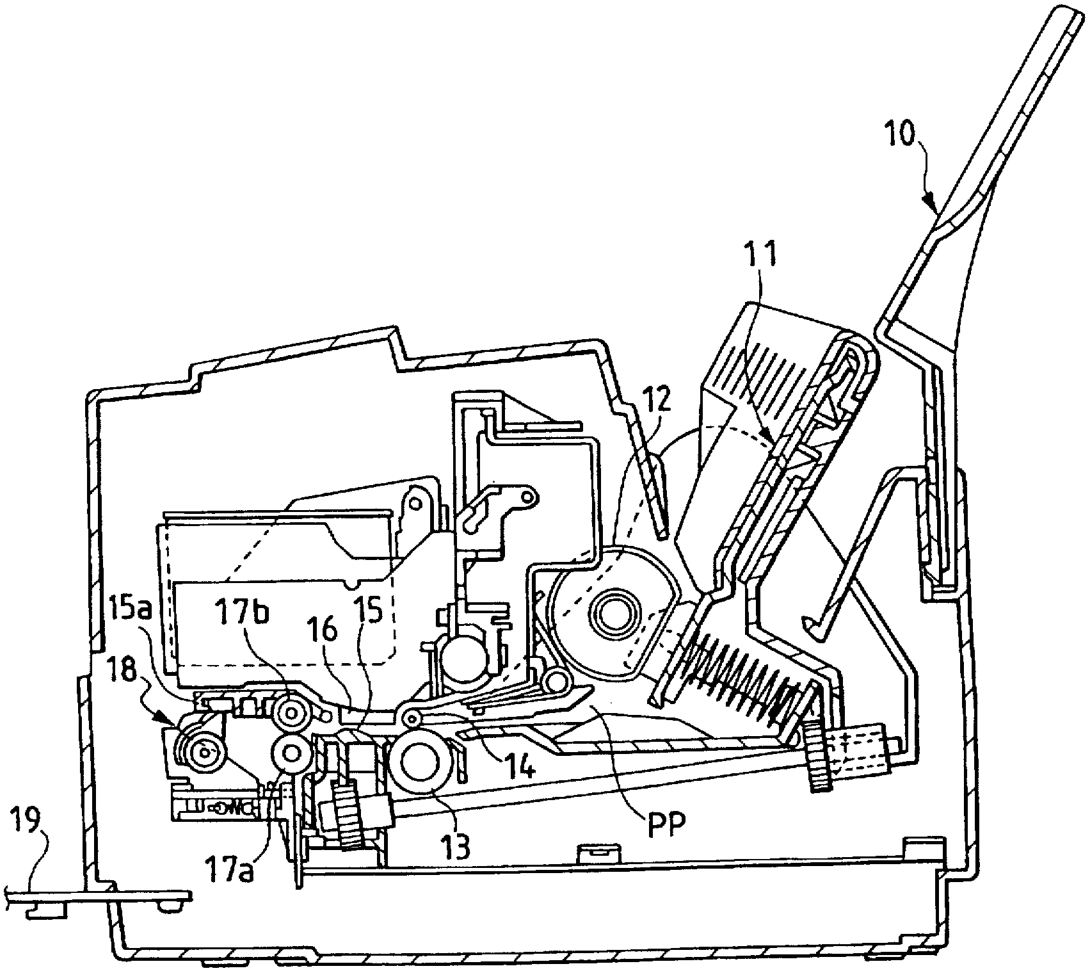
FIG. 1 is a side sectional view showing the inside structure of an ink jet printer which is an example of a recording apparatus suitable to carry out the ink jet recording method according to the present invention.

Referring to the drawings, an embodiment of the present invention will be described.

Figure 2:
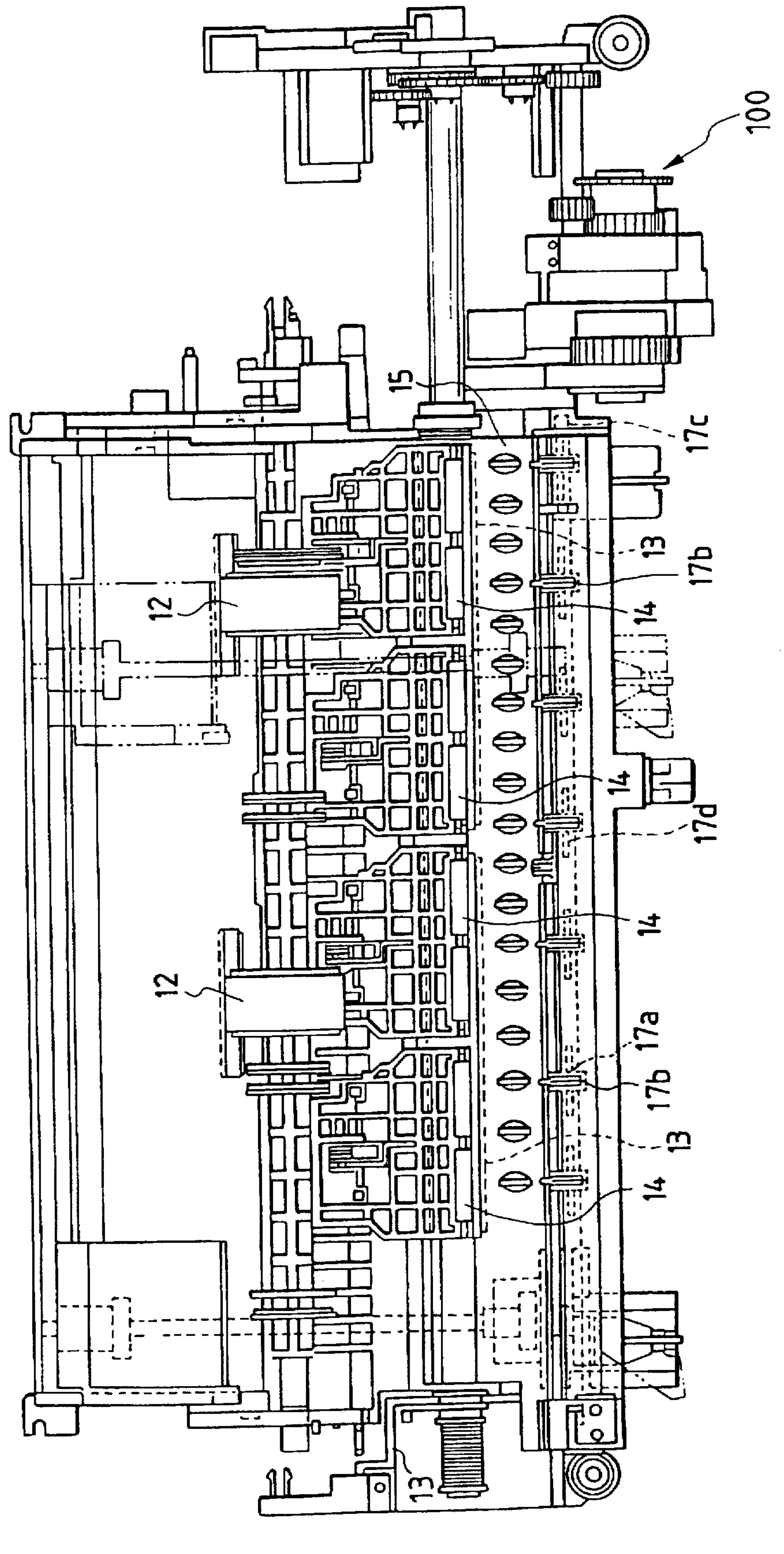
FIG. 2 is a partly omitted plan view showing the same inside structure as FIG. 1.

FIG. 1 is a side sectional view showing the inside structure of an ink jet printer which is an example of a recording apparatus suitable to carry out the ink jet recording method according to the present invention; FIG. 2 is a partly omitted plan view showing the same inside structure; and FIG. 3 is a partly enlarged view of FIG. 1.

In FIG. 1, a plurality of sheet-like recording media to be fed are stacked on a feed tray 10 and a hopper 11.

In feeding, the hopper 11 presses the stack of recording media against a feed roller 12 so that the rotating feed roller 12 touches the upper surface of the uppermost one of the recording media so as to feed out the uppermost recording medium from the stack by its frictional force.

Figure 3:
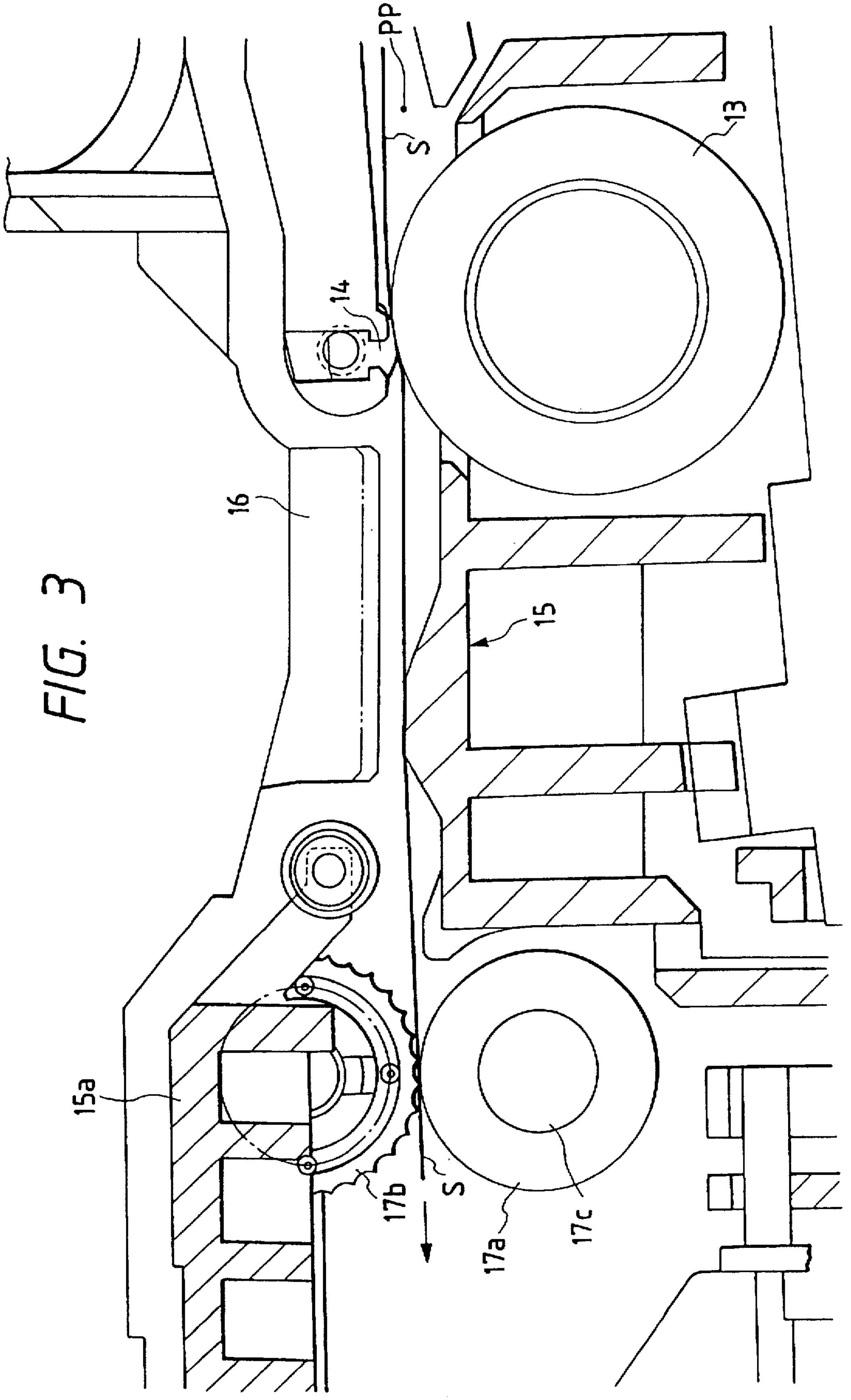
FIG. 3 is a partly enlarged view of a portion of FIG. 1.

As shown in FIG. 3, the fed-out recording medium S reaches a carry roller 13 constituted by a rubber roller through a path PP, and is fed out from the carry roller 13 while the feed angle is restricted by a metal pinch roller 14. The recording medium S fed-out from the carry roller 13 is guided at its under or back surface by a restriction member 15, while ink for monochromatic recording or ink of a plurality of colors for color recording is jetted from a head 16 onto the upper or front surface of the recording medium S to thereby record an image thereon. Thereafter, the recording medium S is carried by discharge rollers 17*a* and notched rollers 17*b* so as to be discharged onto a discharge tray 19 through a discharge portion 18.

Figure 4:
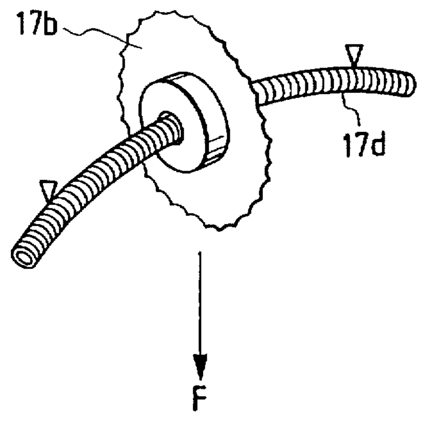
FIG. 4 is a perspective view for explaining the notched roller.
Figure 7:
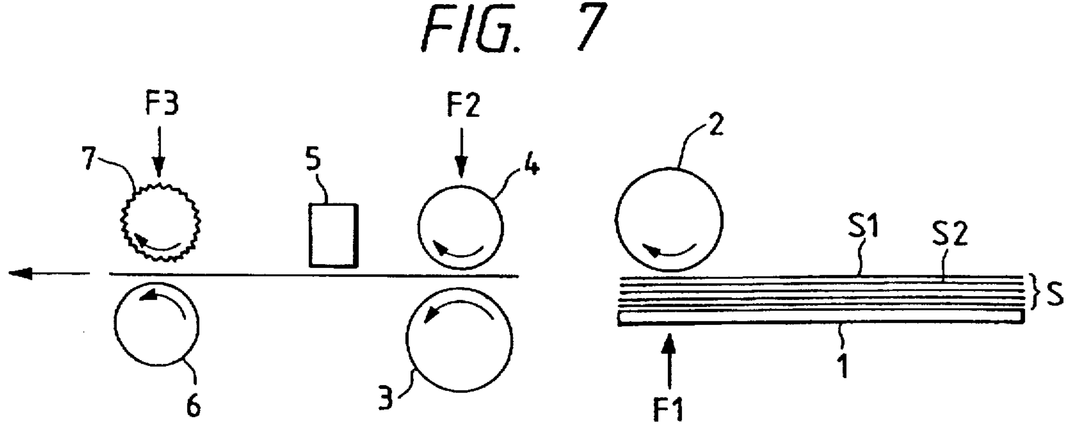
FIG. 7 is a typical view showing a general ink jet printer.

The discharge rollers 17*a* and notched rollers 17*b* are arranged in pairs (7 pairs in the drawings) in the lateral direction of the recording medium as shown in FIG. 2. The discharge rollers 17*a* are respectively constituted by rubber rollers which are driven to rotate by a driving mechanism 100 through a transmission mechanism (not shown), and the notch rollers 17*b* are respectively constituted by metal notched rollers which are pressed against the discharge rollers 17*a* so as to be driven to rotate by the discharge rollers 17*a* respectively. The discharge rollers 17*a* are rotatably supported at their respective shafts 17*c* by side plates of the restriction member 15. The notched rollers 17*b* are rotatably supported by a support plate 15*a* integrally formed with the restriction member 15 so that the notched rollers 17*b* are rotatable with rod-like coil springs 17*d* as rotation shafts, respectively. As shown in FIG. 4, the notched rollers 17*b* are pressed by the spring force of the respective coil springs 17*d* against the corresponding discharge rollers 17*a*, respectively. In FIG. 4, "F" indicates the pressing force of each coil spring 17*d*. The peripheral speed of the discharge rollers 17*a*, that is, the carrying speed of the recording medium S is set to be slightly higher than the feed speed by means of the carry roller 13. Accordingly, after the forward end of the recording medium S has reached the discharge rollers 17*a* and the notched rollers 17*b*, the recording medium S is further carried in a condition that the recording medium S is stretched between the carry roller 13 and the discharge and notched roller pairs 17*a* and 17*b*.

The ink jet recording method according to the present invention can be carried out, for example, by using such an apparatus as described above.

In another aspect of the invention, a sheet-like recording medium having a glossy surface is used. The recording medium is obtained by cast coating method disclosed by, for example, Japanese Patent Application Laid-open Nos. Sho. 63-264391, Hei. 2-113986, Hei. 2-274587, Hei. 6-79967, Sho. 62-15808, Hei. 6-305237, Hei. 7-89220 and Hei. 7-117335.

The recording medium S may be glossy paper having a porous ink-acceptable layer provided on a surface of an original sheet. The ink-acceptable layer may comprise a pigment, a binder and an auxiliary agent. As the pigment, that which is porous and has a low index of refraction for example, amorphous silica, is used in order to obtain high ink-absorbency and high coloring density. As the binder, water-soluble resin which is good in film forming property, for example, PVA (polyvinyl alcohol), or polymeric latex is used in order to obtain high fixing strength and high ink-absorbency. As the auxiliary agent, cationic resin for improving the water resisting property, a light stabilizer for improving the light resisting property, a fluorescent whitening agent for improving the whiteness, etc. are used. A sheet-like recording medium having a porous layer made of specific aluminum hydrate disclosed by, for instance, Japanese Patent Application Laid-open Nos. Hei. 2-276670, Hei. 2-139275 and Hei. 6-279831 may be used. Alternatively, a sheet recording medium obtained by the method including the steps of applying composition of mainly pigment and binding agent, drying half, laying a flat surface sheet thereon, drying them, and peeling the sheet therefrom, disclosed by, for instance, Japanese Patent Application Laid-open No. Sho. 63-151476, may be used.

Alternatively, a recording medium S may be used in which a plural layers having an ink acceptable layer laid on the front surface of the base and the front surface is subjected to the glossing process.

With respect to thickness, the recording medium S described above has the thickness in a range from 50 to 250 μm, preferably from 80 to 200 μm.

The thickness of each notched roller 17*b* for pressing the glossy surface of the recording medium is set to be in a range of from 0.05 to 0.5 mm, preferably, in a range of from 0.1 to 0.3 mm.

The pressing force F of each notched roller 17*b* for pressing the recording medium is set to be in a range of from 5 to 30 g, preferably, in a range of from 10 to 20 g.

Further, image recording by means of a head 16 is carried out in a condition that the quantity of ink absorption per unit area of the sheet-like recording medium is in a range of $4\times10^{-4}$ g/cm$^2$ to $6\times10^{-3}$ g/cm$^2$ when the ink is jetted so that the unit area is entirely covered with dots of the ink (so-called solid printing).

FIG. 5 shows the quantities of ink absorption when solid printing is carried out monochromatically and chromatically by using various heads (No. 1 to No. 11).

In this embodiment, for the recording medium S, a sheet-like recording medium having a glossy surface in which the 60-degree mirror glossiness defined in JIS (Japanese Industrial Standard) is 60% or more is used. More specifically, the recording medium a porous ink-acceptable layer provided on a surface of an original sheet. The ink-acceptable layer may comprise a pigment, a binder and an auxiliary agent. For the pigment, that which is porous and has a low index of refraction is used in order to obtain high ink-absorbency and high coloring density, and, particularly, amorphous silica is most widely used. For the binder, water-soluble resin which is good in film forming property is used in order to obtain high fixing strength and high ink-absorbency, and, particularly, PVA (polyvinyl alcohol) and polymeric latex are widely used. For the auxiliary agent, cationic resin for improving the water resisting property, a light stabilizer for improving the light resisting property, a fluorescent whitening agent for improving the whiteness, etc. are used.

The evaluation of the embodiment applied to the above described recording medium is described below.

<EXAMPLES>

Sheets of glossy paper in which the 60-degree mirror glossiness defined in JIS Z8741 is 60%, 70%, 80% and 90% were used, the pressing force F of each notched roller 17*b* of 0.2 mm thickness was changed from 5 g to 15 g and 30 g for the respective sheets of glossy paper, pattern images (color images) for evaluation were recorded by means of the heads shown in FIG. 5, and then evaluation was made on the feed accuracy and the notch mark.

FIG. 6 shows, in table, the result of the evaluation as examples 1, 2, 3 and 4.

In order to make a comparison with the above examples of the present invention, pattern images for evaluation were recorded while only the pressing force F of each notched roller 17*b* was changed from 3 g to 35 g, and then evaluation was made on the feed accuracy and the notch mark.

In the table of FIG. 6, the result of this evaluation was shown as comparative examples 1, 2, 3 and 4.

As for the evaluation on the feed accuracy, the marks "◎", "○" and "x" in the table have meanings as follows.

That is, the mark "◎" means "very good", that is, sufficient carrying accuracy could be obtained and positional accuracy of the formed dots could be secured so that a glossy image of high resolution could be obtained.

The mark "○" means "good", that is, though the extent is not so high as in the case of the mark "◎", sufficient carrying accuracy could be obtained and positional accuracy of the formed dots could be secured so that a glossy image of high resolution could be obtained.

The mark "x" means "poor", that is, sufficient carrying accuracy could not be obtained and positional accuracy of the formed dots was lowered so that no image of high resolution could be obtained.

As for the evaluation of the notch mark, the marks "◎", "○", "x" and "xx" in the table have meanings as follows.

That is, the mark "◎" means "very good", that is, the notch mark was hardly conspicuous and the quality of the glossy image was not spoiled.

The mark "○" means "good", that is, though the extent is not so high as in the case of the mark "◎", the notch mark was hardly conspicuous and the quality of the glossy image was not spoiled.

The mark "x" means "poor", that is, the notch mark was conspicuous and the quality of the image was spoiled.

The mark "xx" means "very poor", that is, the notch mark was very conspicuous and the quality of the image was greatly spoiled.

From the examples 1, 2, 3 and 4 and the comparative examples 1, 2, 3 and 4 shown in FIG. 6, the following facts can be understood.

That is, it is understood that even in the case where a recording medium having glossiness not lower than 60% is used, the glossy image quality is not spoiled by the notch mark so that a highly accurate carrying state of the recording medium can be obtained to thereby obtain a high-resolution and glossy image so long as the pressing force F of the notched rollers 17*b* is set to be in a range of from 5 to 30 g.

It is further understood that if the pressing force F of the notched rollers 17*b* is 35 g, though a highly accurate carrying state of the recording medium can be obtained, the notch mark is conspicuous, particularly, in the case of glossy paper having glossiness not lower than 80%, the notch mark is very conspicuous so that the image quality is soiled.

It is further understood that if the pressing force F of the notched rollers 17*b* is *3* g, though the notch mark is not conspicuous, sufficient carrying accuracy cannot be obtained and the positional accuracy of the formed dots is lowered so that no high-resolution image can be obtained.

Although the present invention has been described with respect to an embodiment thereof, the present invention is not limited to the above embodiment but may be changed or modified suitably within a scope of the gist of the present invention.

Thus, according to the present invention, the notch marks caused by the notched rollers can be made to be inconspicuous to thereby improve the glossy image quality.

We claim:

1. An ink jet recording method comprising the steps of:

holding a sheet-like recording medium having a glossy surface between a driving roller disposed on a back surface side of said sheet-like recording medium and a notched roller having a thickness in a range of 0.05 to 0.5 mm and pressing said glossy surface with pressing force in a range of 5 to 30 g against said driving roller;

carrying said sheet-like recording medium; and ejecting ink onto said glossy surface so that an image is recorded by dots of the ink on said glossy surface.

2. The ink jet recording method according to claim 1, wherein 60-degree mirror glossiness defined in JIS Z8741 of said glossy surface of said sheet-like recording medium is 60% or more.

3. The ink jet recording method according to claim 1, wherein said sheet-like recording medium includes a coated sheet having an ink acceptable layer provided on a front surface.

4. The ink jet recording method according to claim 1, wherein the image is recorded in a condition that the quantity of ink absorption per a unit area of said sheet-like recording medium is in a range of $4\times10^{-4}$ g/cm$^2$ to $6\times10^{-3}$ g/cm$^2$ when the ink is jetted so that said unit area is entirely covered with dots of the ink.

5. The ink jet recording method according to claim 1, wherein the image recorded by the ink dots has resolution not lower than 360 dpi.

6. The ink jet recording method according to claim 1, wherein said notched roller has a thickness in a range of 0.1 to 0.3 mm.

7. The ink jet recording method according to claim 1, wherein the pressing force is in a range of 10 to 20 g.

8. The ink jet recording method according to claim 1, further comprising the step of:

providing a plurality of pairs of said notched rollers.

* * * * *

UNITED STATES PATENT AND TRADEMARK OFFICE

CERTIFICATE OF CORRECTION

PATENT NO. : 5,781,215
DATED : July 14, 1998
INVENTOR(S) : Onishi et al

It is certified that error appears in the above-identified patent and that said Letters Patent is hereby corrected as shown below:

On the title page, item [56], insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 3 | 5 | 6 | 2 | 2 | 9 | 10/18/94 | Hickman et al. | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | TRANSLATION NO |
|---|---|---|---|---|---|---|---|---|---|---|---|---|---|---|
| | | EP | 0 | 4 | 1 | 88 | 2 | 2 | 3/27/91 | Europe | | | | |
| | | EP | 0 | 5 | 80 | 3 | 9 | 9 | 1/26/94 | Europe | | | | |
| | | EP | 0 | 6 | 22 | 2 | 2 | 6 | 11/2/94 | Europe | | | | |
| | | DE | 19 | 5 | 0 | 44 | 3 | 0 | 8/24/95 | Germany | | | | |
| | | | | | | | | | | | | | | |

Signed and Sealed this

Second Day of March, 1999

Attest:

Q. TODD DICKINSON

*Attesting Officer*

*Acting Commissioner of Patents and Trademarks*